(12) United States Patent
Forthaus et al.

(10) Patent No.: US 11,088,598 B2
(45) Date of Patent: Aug. 10, 2021

(54) ARRANGEMENT OF A ROTATIONAL ANGLE MEASURING SYSTEM ON A HOUSING

(71) Applicant: FRABA B.V., SG Heerlen (NL)

(72) Inventors: Martin Forthaus, Cologne (DE); Michael Loeken, Juelich (DE)

(73) Assignee: FRABA B.V., SG Heerlen (NL)

( * ) Notice: Subject to any disclaimer, the term of this patent is extended or adjusted under 35 U.S.C. 154(b) by 501 days.

(21) Appl. No.: 16/069,172

(22) PCT Filed: Nov. 23, 2016

(86) PCT No.: PCT/EP2016/078558
§ 371 (c)(1),
(2) Date: Jul. 11, 2018

(87) PCT Pub. No.: WO2017/121525
PCT Pub. Date: Jul. 20, 2017

(65) Prior Publication Data
US 2019/0028001 A1 Jan. 24, 2019

(30) Foreign Application Priority Data
Jan. 13, 2016 (DE) .................... 10 2016 100 499.5

(51) Int. Cl.
*H02K 11/01* (2016.01)
*H02K 11/215* (2016.01)
(Continued)

(52) U.S. Cl.
CPC ....... *H02K 11/0141* (2020.08); *H02K 11/215* (2016.01); *G01D 5/12* (2013.01); *G01D 11/245* (2013.01); *H02K 7/1023* (2013.01)

(58) Field of Classification Search
CPC .......... H02K 1/14; H02K 1/146; H02K 1/20; H02K 3/18; H02K 3/20; H02K 3/22; H02K 3/505; H02K 3/521; H02K 3/522; H02K 5/16; H02K 5/161; H02K 5/20; H02K 5/22; H02K 5/225; H02K 7/1023; H02K 9/19;
(Continued)

(56) References Cited

U.S. PATENT DOCUMENTS

2001/0015642 A1 8/2001 Fischer et al.
2001/0025424 A1 10/2001 Kogiso et al.
(Continued)

FOREIGN PATENT DOCUMENTS

CN 101902098 A 12/2010
CN 201885728 U 6/2011
(Continued)

*Primary Examiner* — Alex Torres-Rivera
*Assistant Examiner* — David A. Singh
(74) *Attorney, Agent, or Firm* — Norman B. Thot (57) ABSTRACT

An arrangement of a magnet-based rotational angle measuring system on a drive motor housing part. The arrangement includes the drive motor housing part, a drive shaft with a free end which extends out of the drive motor housing part, an exciter unit connected to the free end of the drive shaft to rotate therewith, a stationary sensor unit which cooperates with the exciter unit to detect a rotary movement of the drive shaft, a shielding body arranged between the stationary sensor unit and the drive motor housing part, and an alignment element which directly aligns the stationary sensor unit with respect to the drive motor housing part.

13 Claims, 3 Drawing Sheets

(51) Int. Cl.
   *G01D 11/24*  (2006.01)
   *G01D 5/12*   (2006.01)
   *H02K 7/102*  (2006.01)

(58) Field of Classification Search
   CPC .......... H02K 9/22; H02K 11/01; H02K 11/21;
                H02K 11/215; H02K 11/225; H02K
         15/0093; H02K 2211/00; H02K 2213/03;
             H02K 11/014; H02K 11/0141; G01D
                       5/12; G01D 11/245; G01D 5/145
   USPC ........................................ 310/68 B, 68 R, 89
   See application file for complete search history.

(56) References Cited

U.S. PATENT DOCUMENTS

| | | |
|---|---|---|
| 2010/0052663 A1 | 3/2010 | Mehnert et al. |
| 2010/0302736 A1 | 12/2010 | Miyashita et al. |
| 2011/0296698 A1 | 12/2011 | Busse-Grawitz et al. |
| 2012/0241281 A1 | 9/2012 | Franz et al. |

FOREIGN PATENT DOCUMENTS

| | | |
|---|---|---|
| CN | 102257364 A | 11/2011 |
| CN | 102575729 A | 7/2012 |
| CN | 104501845 A | 4/2015 |
| DE | 102 01 141 A1 | 8/2003 |
| DE | 10 2009 004 780 A1 | 7/2010 |
| EP | 1 134 540 A1 | 9/2001 |
| EP | 2 494 229 B1 | 7/2013 |
| JP | 2007-82297 A | 3/2007 |
| WO | WO 2009/015496 A1 | 2/2009 |
| WO | WO 2013/084270 A1 | 6/2013 |

ARRANGEMENT OF A ROTATIONAL ANGLE MEASURING SYSTEM ON A HOUSING

CROSS REFERENCE TO PRIOR APPLICATIONS

This application is a U.S. National Phase application under 35 U.S.C. § 371 of International Application No. PCT/EP2016/078558, filed on Nov. 23, 2016 and which claims benefit to German Patent Application No. 10 2016 100 499.5, filed on Jan. 13, 2016. The International Application was published in German on Jul. 20, 2017 as WO 2017/121525 A1 under PCT Article 21(2).

FIELD

The present invention relates to an arrangement of a magnet-based rotational angle measuring system on a drive motor housing part, comprising a drive motor housing part, a drive shaft having a free end extending out of the drive motor housing part, an exciter unit connected to the drive shaft at the free end thereof for conjoint rotation, and a stationary sensor unit which co-operates functionally with the exciter unit in order to detect a rotary movement of the drive shaft.

BACKGROUND

Such rotational angle measuring systems serve to detect rotary movements of a shaft and are often also referred to as an angle measuring device, a rotation sensor or a rotary encoder. Such systems are in particular used to control and monitor electric motors, in particular servomotors, in machines, systems or vehicles. Contactless rotational angle measuring systems, for example, optical or magneto-optical systems, play an important role in this context since they have a long service life due to their wear-free sensor systems. These measuring systems are most often arranged at the axial end of the drive shaft opposite the output side, which end is also referred to as the "B-side". The drive motor housing part, which is also referred to as "motor flange", is in particular designed as a housing surrounding an electric drive motor for driving the drive shaft.

A rotation of a shaft is detected by the measuring unit in a purely magnetic or a magneto-optic manner in magnet-based rotational angle measuring systems, in particular in magnetically induced or in magnetically excited systems, such as magnetic single-turn or multi-turn absolute value encoders. In the purely magnetic systems, which are also referred to as "fully magnetic systems", the measuring unit in particular comprises a rotating exciter unit, such as a permanent magnet, and a stationary sensor unit. The sensor unit comprises a sensor carrier and at least one detection sensor arranged on the sensor carrier, for example, a Hall sensor for a so-called "single-turn detection" or a Wiegand sensor for a so-called "multi-turn detection". The exciter unit may be formed separately and may be fastened on the drive shaft by a fastener. The exciter unit may thus be mounted on the free end of the drive shaft in a relatively simple manner. The exciter unit may alternatively be designed as a part of the drive shaft so that no additional component is required. In magneto-optical systems, an optical code disc measuring system may additionally be provided for the optical detection of the rotary angle position.

Minor, in particular not quantified measuring errors may, however, occur when operating such a magnet-based rotational angle measuring system on a drive shaft, in particular on a drive shaft of an electric motor or an electric generator. Such measuring errors are mostly caused by external disturbances acting on the rotational angle measuring system. Such a disturbance is a magnetic field which is caused, for example, by the drive shaft being magnetized in operation by the electric motor or an electromagnetic brake and by the magnetic field being transmitted through the drive shaft, which is typically made of steel, and finally modifying the rotational magnetic field generated by exciter unit at the rotational angle measuring system, so that measuring inaccuracies or measuring errors are caused in the sensor unit. It is therefore necessary to avoid such disturbances in the rotational angle measuring system to improve measuring accuracy. This may be achieved, for example, by a shield.

Besides the above discussed problem of magnetic disturbances, difficulties also arise under constructional aspects with regard to an exact and permanent alignment of the magnet-based rotational angle measuring system. The alignment and adjustment of individual components of the rotational angle measuring system may be problematic since even slight manufacturing inaccuracies or deviations from tolerances may lead to deviations and errors in the measuring results. The usual concentricity requirements for optical or magnetic sensors are, for example, in a range of 0.01 mm. It is therefore necessary that the individual components, such as the sensor unit, the exciter unit, the shielding body, or other intermediate parts, are manufactured, manually assembled, aligned relative to each other, and adjusted with particular precision. The manufacture and assembly of such rotational angle measuring systems is therefore relatively complicated and thus costly.

SUMMARY

An aspect of the present invention is to provide an arrangement of a magnet-based rotational angle measuring system on a drive motor housing part which allows for an exact and trouble-free measuring and in particular for a simple and economic manufacture and assembly.

In an embodiment, the present invention provides an arrangement of a magnet-based rotational angle measuring system on a drive motor housing part. The arrangement includes the drive motor housing part, a drive shaft comprising a free end which is configured to extend out of the drive motor housing part, an exciter unit connected to the free end of the drive shaft to rotate conjointly therewith, a stationary sensor unit configured to functionally cooperate with the exciter unit so as to detect a rotary movement of the drive shaft, a shielding body arranged between the stationary sensor unit and the drive motor housing part, and an alignment element configured to directly align the stationary sensor unit with respect to the drive motor housing part.

BRIEF DESCRIPTION OF THE DRAWINGS

The present invention is described in greater detail below on the basis of embodiments and of the drawings in which.

DETAILED DESCRIPTION

According to the present invention, a shielding body, in particular a magnetic shielding body, is arranged between the sensor unit and the drive motor housing part, wherein an element for direct alignment of the sensor unit with respect to the drive motor housing part is provided. It is thereby possible to obtain both a shielding and an uncomplicated, exact, economic and permanent alignment of the sensor unit. The alignment element in particular allows the sensor unit to be oriented directly on the housing of the drive motor, in particular with respect to the drive shaft. In this context, the term "directly" means that the alignment of the sensor unit with respect to the drive motor housing part can be made immediately, i.e., exclusively between these two components mentioned above. In particular, no further parts or components are provided or arranged between the sensor unit and the drive motor housing part for alignment. The tolerance may thus be reduced for alignment to only these two parts and an adding of tolerances, which may occur in a stacked structure, can be avoided. Dimensional tolerances between the stationary sensor unit, the rotating parts, and the housing part can also be observed in a particularly simple and exact manner. It is possible in this regard, for example, during the manufacture of the drive motor housing part, to produce all functional dimensional tolerances in one setting and in one operation. By the arrangement of the shielding body between the sensor unit and the drive motor housing part it is also possible to provide an almost complete shielding of the rotational angle measuring system from magnetic disturbances of the drive motor so that measuring accuracy can be significantly enhanced. The shielding body can, for example, be arranged axially between the sensor unit and the drive motor housing part therefor. The alignment element and the exciter unit may be arranged (for example in this order) between the shielding body and the sensor unit. The shielding body can, for example, be adapted to the geometry of the drive motor housing part and/or the sensor unit, specifically the sensor carrier. The drive motor housing part may form a part of the entire motor housing and is in particular formed as a main part of the motor housing.

The alignment element may basically comprise a plurality of mutually corresponding parts, for example, a pin and a recess receiving the pin. The alignment element may be designed individually and may, for example, be formed as separate parts. The alignment element can, for example, be formed on the sensor unit, on the drive motor housing part and/or on the shielding body. The number of the parts and therefore the manufacturing and assembly costs can thus be relatively low. The sensor unit and the drive motor housing part can thus also be aligned with each other in a particularly precise manner.

The alignment element can, for example, extend from the sensor unit into the drive motor housing part. The alignment element may advantageously extend at least partly through at least one recess formed in the shielding body. This allows for a relatively simple and uncomplicated alignment of the sensor unit with respect to the drive motor housing part.

For a direct alignment of the sensor unit with respect to the drive motor housing part, the alignment element can, for example, comprise at least one centering pin. The centering pin may be formed separately or as a part of a component of the rotational angle measuring system. The centering pin can, for example, be formed as a part of the drive motor housing par, for example, as a projection protruding axially from the drive motor housing part. The centering pin need not necessarily be round and rod-shaped, but may have any optional shape, for example, rectangular and/or conically tapering. The centering pin may in particular be a centering web formed on the housing part and protruding axially. The centering pin may extend from the drive motor housing part into the sensor unit, especially into a corresponding recess formed in the sensor unit or a corresponding circumferential shoulder where the centering pin may be inserted or against which it may abut. A direct and particularly exact alignment of the sensor unit relative to the drive motor housing part may thus be achieved and thereby a particularly high measuring accuracy of the measuring system can be provided. It should be clear that the centering pin may also be arranged inversely, i.e., as a projection formed on the sensor unit which extends into a recess formed in the drive motor housing part. A plurality of centering pins, for example, three, is advantageously provided which are arranged along the circumference of the housing part at a defined angular ratio. The sensor unit may thereby be configured to be placed axially on the drive motor housing part in only a single rotational orientation. It is thus possible to achieve a particularly exact alignment of the sensor unit and eventually also the shielding body with respect to the drive motor housing part.

The alignment element can, for example, comprise at least one planar, in particular a disc-shaped centering body. The centering body may extend at least in part from the sensor unit into the drive motor housing part. The alignment element for the direct alignment of the sensor unit with respect to the drive motor housing part may in this case be manufactured and assembled separately and independently of at least a part of the components of the rotational angle measuring system. The planar centering body may in particular be an injection molded or cast part of plastic material. The planar centering body can, for example, be designed as a fitting component which can be inserted by at least a part into a corresponding recess in one of the components of the rotational angle measuring system.

The planar centering body can, for example, be arranged axially between the sensor unit and the drive motor housing part. The planar centering body may here in particular be arranged axially between the sensor unit and the shielding body. The planar centering body can in particular be arranged, for example, axially between the exciter unit and the shielding body so that, as seen in the axial direction, the following arrangement may be provided: drive motor housing part, shielding body, centering body, exciter unit and sensor unit. It may be provided that the exciter unit comprises a pin, bolt or projection projecting axially towards the drive shaft, which extends axially both through a coaxial recess formed in the shielding body and through a coaxial recess formed in the centering body, and into the drive shaft. The pin of the exciter unit is in particular not magnetizable and may serve as an axial extension of the drive shaft. This allows for a particularly simple and effective alignment of the sensor unit with respect to the drive motor housing part. The centering body can also be inserted and integrated into the rotational angle measuring system in a relatively uncomplicated manner.

The planar centering body can, for example, be formed as an annular disc which is coaxial with to respect to the drive shaft, the disc comprising at least one first protrusion projecting axially towards the sensor unit and/or at least one second protrusion projecting axially towards the drive motor housing part. The first protrusion can, for example, also project towards the shielding body. The annular disc need not necessarily be round but may have an optional planar shape which comprises a central opening for the passage of the drive shaft or of an axial extension of the shaft, such as, for example, the above-mentioned projection of the exciter unit. The sensor unit, the shielding body and/or the drive motor housing part may each be formed with corresponding indentations or recesses into which the protrusions of the centering body can advantageously be exactly inserted and in only a single relative rotational orientation of the components. The centering body can thereby be aligned and fastened in a relatively simple and exact manner with respect to the shielding body and the drive motor housing part. The rotational angle measuring system can also be of a relatively space-saving structure and can be assembled in a relatively simple manner.

The protrusion can, for example, be designed as a centering pin, a centering ring or a centering block. The first protrusion can, for example, be designed a centering pin and the second protrusion can, for example, be designed as a centering ring or a centering block. The centering body may in particular be formed with two eccentrically arranged centering pins as the first protrusion and with a centering block arranged coaxially with respect to the drive shaft as the second protrusion. The centering block may specifically be designed as a solid hollow body on the centering body, or it may be configured to be open on one side, i.e., on one axial side. An axially protruding centering ring may alternatively be provided. The planar centering body may consequently be inserted with its two centering pins designed as the first protrusion into a respective corresponding recess formed in the shielding body, and may be inserted with its centering block designed as the second protrusion into a corresponding recess formed in the drive motor housing part. The planar centering body can thereby be aligned with respect to the shielding body and the drive motor housing part in a particularly simple manner.

The shielding body can, for example, be configured to be stationary, i.e., as a non-rotating part. The shielding body can thus be designed and dimensioned independent of the drive shaft and its possible speeds. The shielding body is in particular not subject to oscillations or vibrations during operation. A balancing of the shielding body is not required. The shielding body can thus have a relatively simple structure and can thus be manufactured particularly economically. The shielding body can, for example, be made of a so-called "Mu-metal", i.e., a nickel-iron alloy. The shielding body is alternatively made of steel or another magnetically conductive material.

The shielding body can, for example, be configured as an annular disc coaxial to the drive shaft, the disc having an axial section arranged on the radial outer side of the annular disc and protruding from the annular disc. The annular disc can, for example, comprise a central or coaxial opening through which the drive shaft and/or a fastening device of the exciter unit can extend. The diameter of this opening can, for example, only be slightly larger than that of the drive shaft. The axial section may in particular be a circumferential wall protruding axially from the annular disc towards the sensor unit and/or towards the housing. The axial section can thereby be formed in particular as a cylinder section so that a very large circumferential surface is provided. The shielding body can, for example, be magnetically conductive or can, for example, comprise a relatively high magnetic permeability so that a magnetic field generated, for example, in the region of the opening of the annular disc is transmitted radially outward through the annular disc and can be transmitted further, or be effectively transferred to an adjacent component, through the axial section provided on the radial outer side of the annular disc. A radially inner portion can thereby be formed on the axial section which can be magnetically insulated in a particularly effective manner; this portion is therefore particularly well suited for arranging and/or coupling the exciter unit to the drive shaft. A structure of the rotational angle measuring system is also provided that is relatively simple to assemble and requires little space.

The axial section can, for example, surround the sensor unit and/or the exciter unit radially, at least in part. As mentioned above, the exciter unit can be arranged in the radially inner region of the axial section of the shielding body. In an embodiment of the present invention, the axial section can, for example, be formed with such an axial height or length that the axial section also surrounds the sensor unit radially, at least in part. It is thereby possible to realize a particularly effective shielding of the rotational angle measuring system against magnetic disturbances.

The shielding body can, for example, have at least one recess through which the alignment element extends. For example, the shielding body has a recess or an opening formed in the circumferential direction in a radial circumferential portion through which the alignment element which can, for example, be designed as a web or a projection, may extend, for example, in the axial direction. As an alternative or in addition thereto, the recess may be a bore through which the alignment element in the form of a pin extends. The recess can, for example, be designed so that the alignment element can extend through the recess in a contactless manner. The alignment of the sensor unit with respect to the drive motor housing part can thus be made directly and only with respect to the drive motor housing part, i.e., irrespective of the shielding body. For example, the recess in the form of a bore has a larger diameter than a centering pin extending therethrough. The shielding body advantageously has a separate recess for each centering element or each centering pin.

The drive motor housing part can, for example, surround an electric motor. An axial housing cover may further be provided which at least partly surrounds the sensor unit, the shielding body, and the free end of the drive shaft. This allows for a relatively simple structure and a relatively simple assembly. The drive motor housing part can, for example, additionally at least partly surround the shielding body radially. A particularly effective shielding of the measuring unit or the rotational angle measuring system from disturbances, which occur on the outer side of the rotational angle measuring system and which could have a negative influence on the rotational angle measuring system can be achieved thereby. The drive motor housing part may alternatively also be formed as a separate second housing cover. The housing can, for example, be made of steel.

A fixing element can, for example, be provided for the fixation of the element for direct alignment of the sensor unit with respect to the drive motor housing part. The fixing element may be provided on the centering element, the drive motor housing part, and/or the shielding body. The fixing element may be a locking connection or a friction connection. A catch can, for example, be arranged on the centering body which is configured to be engaged with a corresponding recess formed in the drive motor housing part and/or in the shielding body. As an alternative or in addition thereto, a friction surface may be provided on the centering body which is configured to be engaged with a corresponding surface formed on the drive motor housing part and/or the shielding body in a manner similar to a press fit. An alignment of the sensor unit with respect to the drive motor housing part can thereby be provided that is particularly simple to assemble and effective. The arrangement of the individual components of the fixing element with respect to the centering body, the drive motor housing part, and/or the shielding body may of course also be inverted.

The present invention will be described in greater detail below under reference to three embodiments and to the accompanying drawings.

Figure 1:
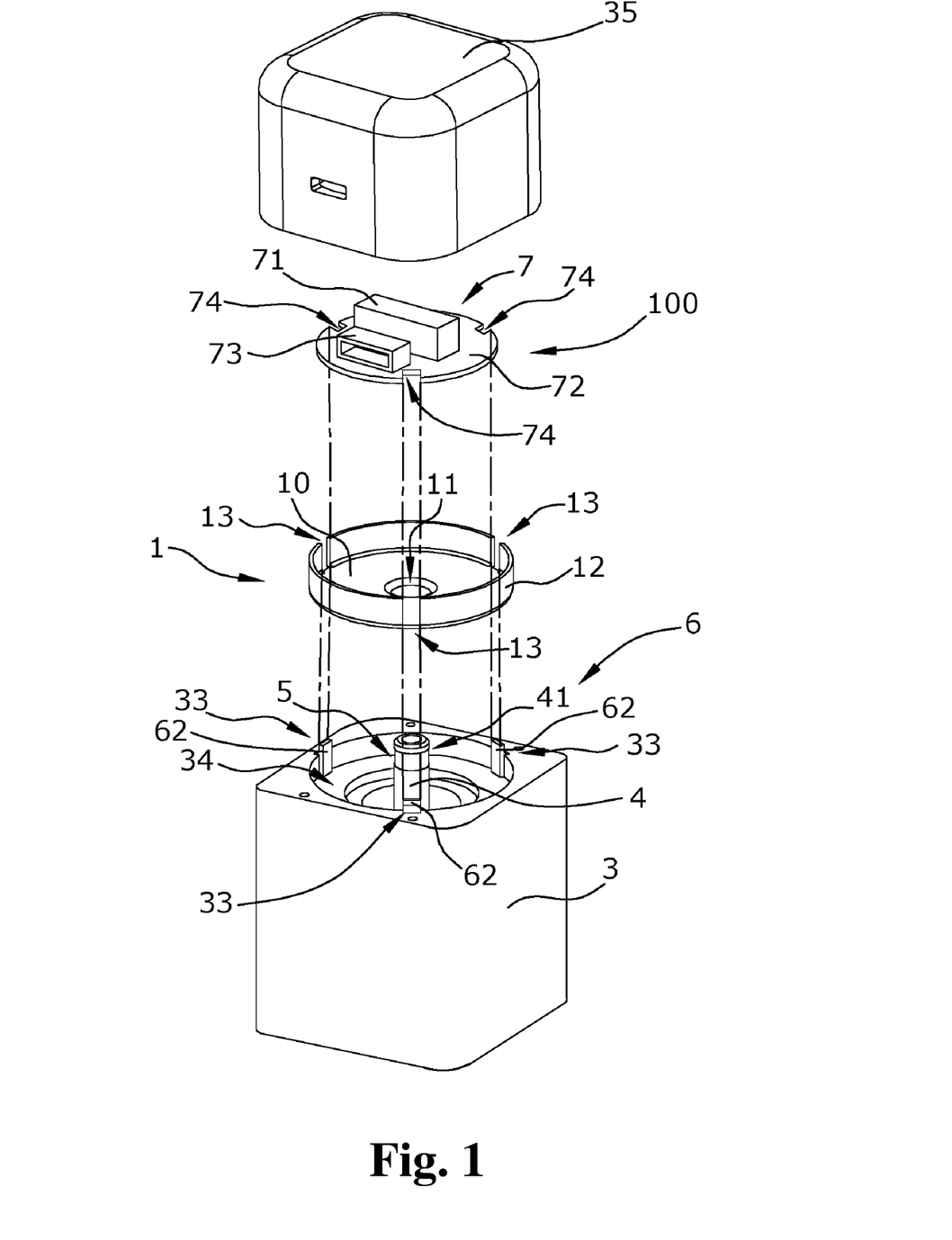
FIG. 1 schematically shows a perspective exploded view of a first embodiment of an arrangement of a rotational angle measuring system on a drive motor housing part according to the present invention.
Figure 2:
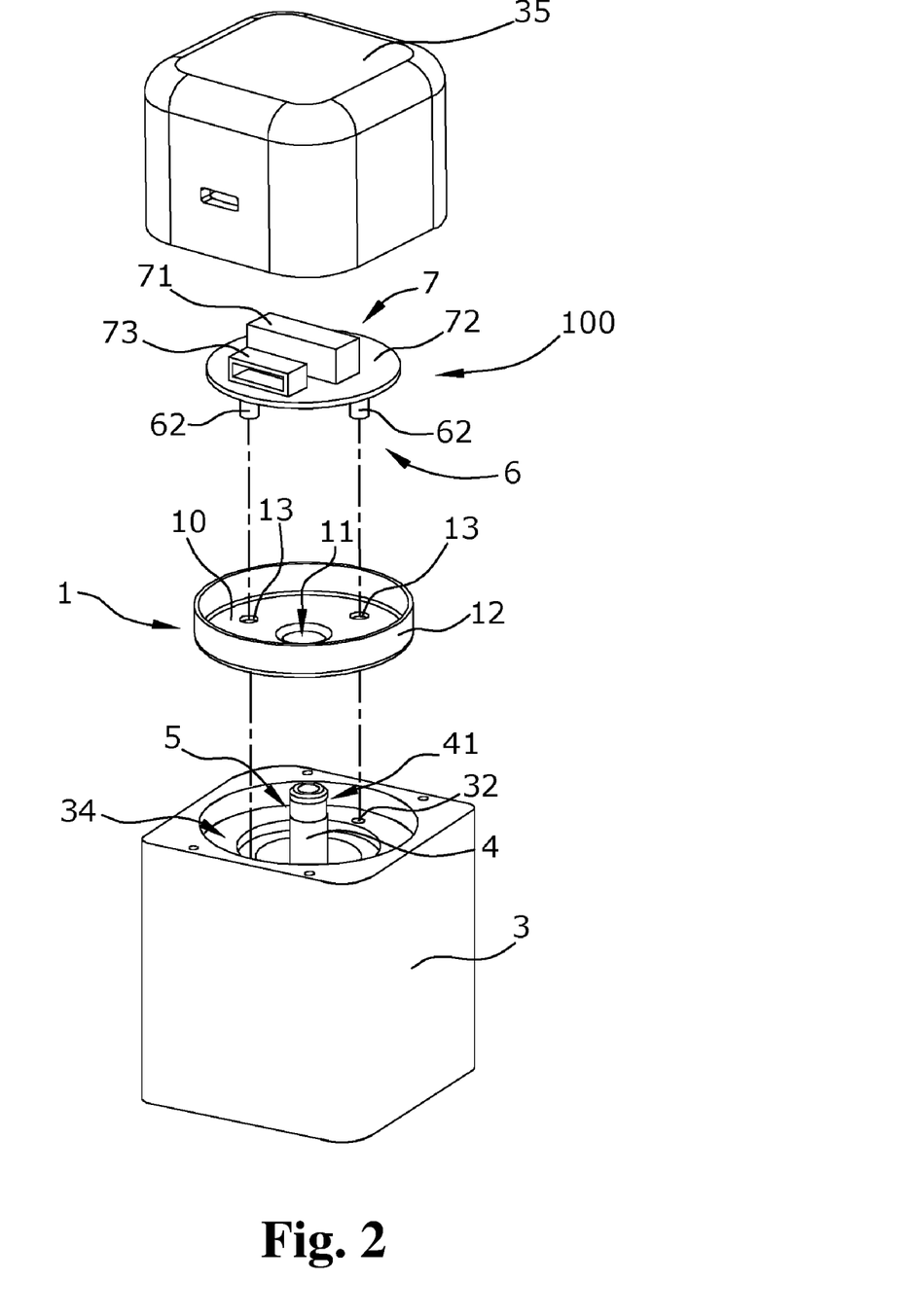
FIG. 2 schematically shows a perspective exploded view of a second embodiment of an arrangement of a rotational angle measuring system on a drive motor housing part according to the present invention.

FIGS. 1 and 2 respectively show a rotational angle measuring system 100 for fitting or coupling with a drive motor housing part 3 or a drive shaft 4. The rotational angle measuring system 100 is in particular arranged directly at a free end of the drive shaft 4 so that no additional shaft is required for measurement acquisition.

The drive motor housing part 3 is presently formed as a housing box for an electric motor accommodated therein (which electric motor is not shown in the drawings). Such a drive motor housing part 3 is usually made of aluminum and is therefore not suited for magnetization by external magnetic fields caused, for example, by a motor brake. At least one mounting flange is formed at a first free end of the drive motor housing part 3, via which flange the drive motor housing part 3 or the so-called motor flange can be mounted on a machine. At an opposite free end at which the rotational angle measuring system 100 is arranged, the drive shaft 4 extends through an opening in the drive motor housing part 3. A housing cover 35 is provided as a closure of the drive motor housing part 3, which housing cover 35 is arranged at the free end 41 of the drive shaft 4 and surrounds the rotational angle measuring system 100 at least in part.

The drive shaft 4 is typically a solid shaft of steel suited to be magnetized at least in part. The drive shaft 4 can in particular be magnetized in operation by the (not illustrated) electric motor or by a magnetic brake (which is not shown in the drawings) which is in contact with the drive shaft 4. A shielding from disturbing magnetic fields is required to avoid measuring errors caused thereby, in particular in the magnet-based rotational angle measuring system 100 which may be in direct contact with the drive shaft 4.

The rotational angle measuring system 100 comprises an exciter unit 5 arranged at the drive shaft 4, and a separate sensor unit 7. The exciter unit 5 can comprise a magnet carrier (not shown in the drawings) with at least one permanent magnet arranged thereon (not shown in the drawings). In addition or as an alternative, an optical code disc (not shown in the drawings) can be arranged on the drive shaft 4 for optical detection. The sensor unit 7 is stationary and in particular comprises a sensor 71, for example, a Hall sensor, a Wiegand sensor and/or an optical sensor, which is fastened to a sensor carrier 72. The sensor 71 is suited for detecting each rotation of the drive shaft 4. The sensor unit 7 further comprises processing electronics 73.

A shielding body 1 is provided for dissipating a disturbing magnetic field from the sensor unit 7, in particular a magnetic shielding body arranged between the sensor unit 7 and the drive motor housing part 3. The shielding body 1 is here designed as a stationary component of the rotational angle measuring system 100. The shielding body 1 is designed as an annular disc 10 with an axial section 12, in particular a coaxial cylindrical section, extending circumferentially on the radial outer side of the annular disc 10. A magnetic shielding can thereby be effected both in the axial and in the radial direction. The annular disc 10 of the shielding body 1 has a coaxial opening 11 through which the drive shaft 4 extends. A magnetic field existing in the drive shaft 4 can thus at least partly be transmitted directly into the shielding body 1 in the radial direction. The axial section 12 is formed on the radial outer side to transmit this magnetic field from the shielding body 1. The axial section 12 extends axially from form one side of the annular disc 10 towards the sensor unit 7. The shielding body 1 is made of a magnetically conductive material, for example, of iron or steel. A magnetic field concentrated in the drive shaft 4 and/or the housing 3 can thus be dissipated to the outside from the rotational angle measuring system 100.

For aligning the sensor unit 7 with respect to the drive motor housing part 3, an alignment element 6 is provided which allows the sensor unit 7 to be aligned with respect to the drive motor housing part 3 in a direct and exact manner and so that it is relatively simple to assemble.

In the embodiment shown in FIG. 1, the alignment element 6 is designed as three centering pins 62 which are arranged on the drive motor housing part 3 in the form of rectangular projections 33. The centering pins 62 are in particular arranged regularly in the circumferential direction, i.e., at a mutual angle of 120°, and they protrude axially from the drive motor housing part 3 towards the sensor unit 7. In the mounted state of the rotational angle measuring system 100, the centering pins 62 extend from the drive motor housing part 3 through the shielding body 1 into the sensor unit 7. For this purpose, the sensor carrier 72 is formed with three seats 74 corresponding to the projections 33 with which the projections 33 are respectively engaged for an exact alignment of the sensor unit 7 with respect to the housing part 3. The seats 74 each allow for a precise fit of a free end of the projections 33 in the seat 74. A protection against twisting of the sensor carrier 72 relative to the drive motor housing part 3 is thereby made possible. As an alternative, the seats 74 can be formed in the circumferential direction not only in sections, but continuously so that a shoulder is formed on the sensor carrier 72 on which the protrusions 33 abut. In such an embodiment, the sensor carrier 72 can be set on the drive motor housing part 3 or on the shielding body 1 as desired in the circumferential direction.

As illustrated in FIG. 1, each projection 33 extends from the drive motor housing part 3 in an advantageously contactless manner through an opening or recess 13 arranged on the radial outer side in the shielding body 1. The recesses 13 are each formed to be larger than the projections 33, in particular in the circumferential direction, so that the projections 33 can each be passed through the recess 13 in a contactless manner. A direct and exact alignment of the sensor unit 7 with respect to the drive motor housing part 3 is possible, in particular without adding a dependence of the alignment of the shielding body 1.

The projections 33, the recesses 13, and the seats 74 are arranged circumferentially with a defined angular ratio with respect to each other, namely, as mentioned above, under an angle of 120° with respect to each other. The sensor carrier 72 and the shielding body 1 can thereby be set into a recess 34 of the drive motor housing part 3 and on the projections 33 in a defined position and can be secured against twisting. A particularly high measuring accuracy can thus be provided.

The arrangement in FIG. 2 is almost identical with that shown in FIG. 1 except for the alignment element 6. In the embodiment shown in FIG. 2, the alignment element 6 is configured as two centering pins 62 which are formed on the sensor carrier 72 and which protrude axially from the sensor carrier 72 towards the drive motor housing part 3. In the shown embodiment, the centering pins 62 are arranged on the sensor carrier 72 under a defined angle with respect to each other so that the sensor carrier 72 can be set on the drive motor housing part 3 and the shielding body 1, respectively, in only a single predetermined rotational orientation. In the mounted state of the rotational angle measuring system 100, the centering pins 72 extend from the sensor carrier 72 through the shielding body 1 into the drive motor housing part 3. For this purpose, the drive motor housing part 3 is formed with two centering pin seats 32 corresponding to the centering pins 62 with which the centering pins 62 are respectively engaged for the exact alignment of the sensor unit 7 with respect to the drive motor housing part 3. The centering pin seats 32 each allow for an exact fit of a free end of the centering pins 62.

Figure 3:
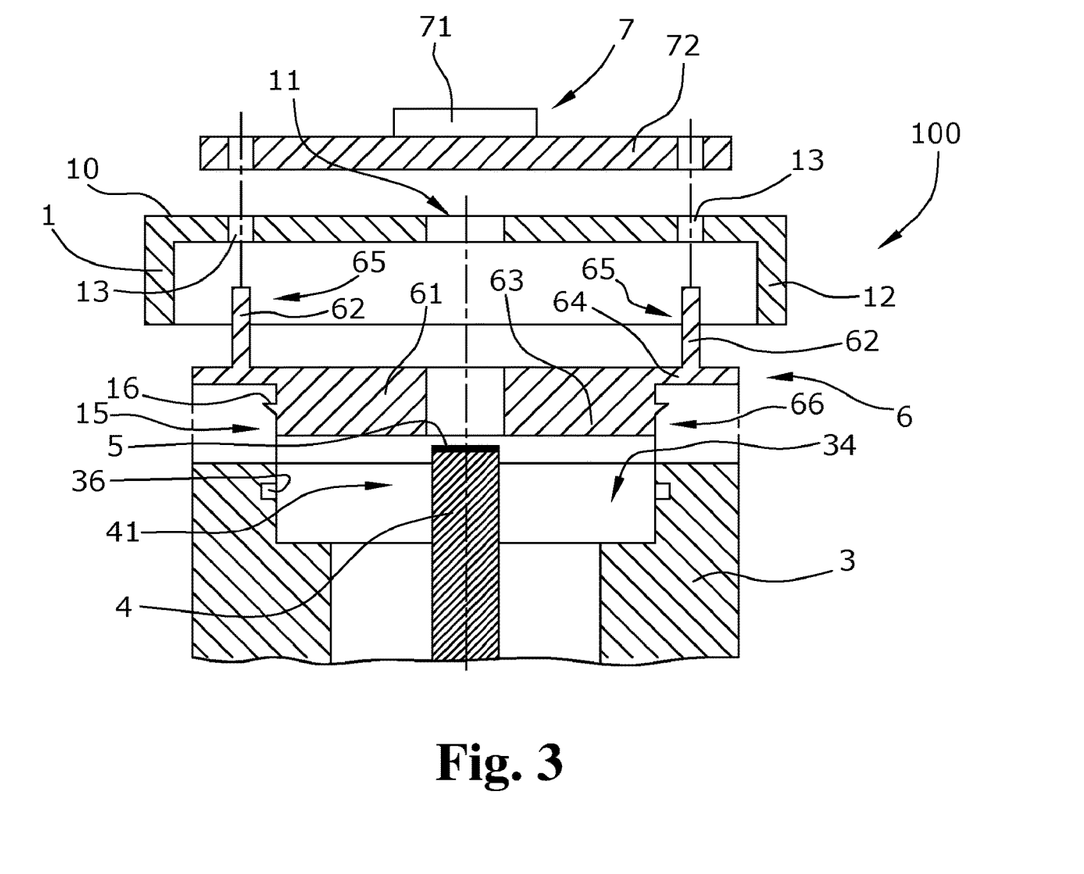
FIG. 3 schematically shows a detail of an exploded sectional view of a third embodiment of an arrangement of a rotational angle measuring system on a drive motor housing part according to the present invention.

FIG. 3 shows a third embodiment according to the present invention wherein only a detail of the rotational angle measuring system 100 is shown. In particular, FIG. 3 only shows the axial end portion of the drive motor housing part 3 in which the alignment element 6, the shielding body 1, and the sensor unit 7 are arranged.

In this embodiment, the alignment element 6 comprises a planar centering body 61 that extends at least partly in the axial direction from the sensor unit 7 into the drive motor housing part 3. The centering body 61 is formed as a separate part and is arranged axially between the shielding body 1 and the drive motor housing part 3. The centering body 61 can thus be manufactured and mounted independently of at least a part of the shielding body 1, the drive motor housing part 3, and the drive shaft 4 of the rotational angle measuring system 100.

The centering body 61 is in particular made of a plastic material. The centering body 61 comprises an annular disc 64 coaxial to the drive shaft 4, which annular disc 64 has a first protrusion 65 projecting axially towards the shielding body 1 and two eccentrically arranged second protrusions 66 protruding axially towards the drive motor housing part 3.

The first protrusion 65 is formed as two axially projecting centering pins 62. In the mounted state, the centering pins 62 each extend through a recess 13 formed in the shielding body 1 and into a corresponding recess in the sensor unit 7, in particular in the sensor carrier 72. A direct alignment or adjustment of the sensor unit 7 can thus be effected with respect to the centering body 61, in particular without requiring any additional accuracy of fit with respect to the shielding body 1.

The second protrusion 66 is formed in particular as a round solid centering block 63. The centering block 63 has an outer diameter that is only slightly smaller than a recess 34 formed in the drive motor housing part 3 into which the centering block 63 is inserted in the manner of a press fit. It is thereby possible to achieve a particularly stable fixation of the centering block 63 with respect to the drive motor housing part 3.

A fixing element 15 is formed between the centering body 61, in particular the centering block 63, and the drive motor housing part 3. In the shown embodiment, four elastic clips or locking noses 16 are formed on a radial outer wall of the centering block 63 which are distributed regularly over the circumference. The locking noses 16 can each be brought into engagement with a corresponding recess 36 formed in the drive motor housing part 3, and may in particular engage in the drive motor housing part 3. The centering block 63 or the centering body 61 can thereby be fixed axially with respect to the drive motor housing part 3 in a relatively simple manner.

For mounting the rotational angle measuring system 100 of FIG. 3, it is provided that, first, the centering body 61 is aligned with the shielding body 1, is then set thereon, and is then glued thereto. The sensor unit 7 is thereafter set on the centering pins 62 extending through the shielding body 1 and projecting axially from the shielding body 1, and is glued to the shielding body 1. The package of the sensor unit 7, the shielding body 1, and the centering body 61 is then placed on the housing part 3 and is fixed thereon using the fixing element 15.

It should be clear that, in the described embodiments, at least the drive shaft 4, the shielding body 1, the second shielding body 2, the sensor carrier 72, and the housing part 3 have a common longitudinal axis. It is thus possible to integrate a high-resolution magnetic (multi-turn) sensor unit 7 with magnetic field shielding in a motor housing in a space-saving manner. Reference should also be had to the appended claims.

REFERENCE NUMERALS 100 rotational angle measuring system
1 shielding body
10 annular disc
11 coaxial opening
12 axial section
13 opening, recess, bore
15 fixing element
16 lock, clip, groove(s), locking nose(s)
3 drive motor housing part
32 centering pin seat
33 projection
34 recess
35 housing cover
36 recess
4 drive shaft
41 free end
5 exciter unit
6 alignment element
61 centering body
62 centering pin
63 centering ring, centering block
64 annular disc
65 first protrusion
66 second protrusion
7 sensor unit
71 sensor
72 sensor carrier
73 process electronics
74 seat

What is claimed is:
1. An arrangement of a magnet-based rotational angle measuring system on a drive motor housing part, the arrangement comprising:
the drive motor housing part;
a drive shaft comprising a free end which is configured to extend out of the drive motor housing part;
an exciter unit connected to the free end of the drive shaft to rotate conjointly therewith;
a stationary sensor unit configured to functionally cooperate with the exciter unit so as to detect a rotary movement of the drive shaft;
a shielding body arranged between the stationary sensor unit and the drive motor housing part; and
an alignment element configured to directly align the stationary sensor unit with respect to the drive motor housing part, wherein,
the shielding body comprises at least one recess which is configured to have the alignment element extend therethrough.

2. The arrangement as recited in claim 1, wherein the alignment element is formed on at least one of the stationary sensor unit, the drive motor housing part, and the shielding body.

3. The arrangement as recited in claim 1, wherein the alignment element is further configured to extend from the stationary sensor unit into the drive motor housing part.

4. The arrangement as recited in claim 1, wherein the alignment element comprises at least one centering pin.

5. The arrangement as recited in claim 4, wherein the alignment element comprises at least one planar centering body.

6. The arrangement as recited in claim 5, wherein the at least one planar centering body is arranged axially between the stationary sensor unit and the drive motor housing part.

7. The arrangement as recited in claim 5, wherein the at least one planar centering body is formed as an annular disc which is coaxial to the drive shaft, the annular disc comprising at least one of at least one first protrusion arranged to project axially towards the stationary sensor unit and at least one second protrusion arranged to project axially towards the drive motor housing part.

8. The arrangement as recited in claim 7, wherein at least one of the at least one first protrusion and the at least one second protrusion is formed as the at least one centering pin, a centering ring, or a centering block.

9. The arrangement as recited in claim 1, wherein the shielding body is stationary.

10. The arrangement as recited in claim 1, wherein the shielding body is provided as an annular disc which is arranged coaxial to the drive shaft, the annular disc comprising a circumferential section which is arranged to project axially on a radially outer side of the annular disc.

11. The arrangement as recited in claim 10, wherein the circumferential section is arranged to at least partly surround at least one of the stationary sensor unit and the exciter unit.

12. The arrangement as recited in claim 1, further comprising:
an electric motor; and
an axial housing cover,
wherein,
the drive motor housing part is configured to surround the electric motor, and
the axial housing cover is configured to at least partly surround the stationary sensor unit, the shielding body, and the free end of the drive shaft.

13. The arrangement as recited in claim 1, further comprising:
a fixing element configured to fix the alignment element, wherein,
the fixing element is arranged at at least one of the alignment element, the stationary sensor unit, the drive motor housing part, and the shielding body.

* * * * *